United States Patent
Wolf et al.

(10) Patent No.: US 9,248,875 B2
(45) Date of Patent: Feb. 2, 2016

(54) DRIVING FLIPPER WITH ROBOTIC ARM

(71) Applicant: Robo-Team Ltd., Tel-Aviv (IL)

(72) Inventors: Yosi Wolf, Tel-Aviv (IL); Elad Levy, Tel-Aviv (IL); Itamar Borowitz, Tel-Aviv (IL); Daniel Cantor, Tel-Aviv (IL); Yehonatan Asher, Tel-Aviv (IL); Mor Rotbart, Givataim (IL); Mark Vaynberg, Rishon-LeZion (IL)

(73) Assignee: Robo-Team Ltd., Tel-Aviv (IL)

( * ) Notice: Subject to any disclaimer, the term of this patent is extended or adjusted under 35 U.S.C. 154(b) by 0 days.

(21) Appl. No.: 13/864,326

(22) Filed: Apr. 17, 2013

(65) Prior Publication Data

US 2013/0270017 A1    Oct. 17, 2013

Related U.S. Application Data

(60) Provisional application No. 61/625,203, filed on Apr. 17, 2012.

(51) Int. Cl.

| B25J 5/00 | (2006.01) |
|---|---|
| B62D 55/065 | (2006.01) |
| B62D 55/075 | (2006.01) |
| B62D 65/02 | (2006.01) |
| B25J 19/02 | (2006.01) |
| B62D 57/024 | (2006.01) |

(52) U.S. Cl.
CPC .............. *B62D 55/075* (2013.01); *B25J 5/005* (2013.01); *B25J 19/023* (2013.01); *B62D 55/065* (2013.01); *B62D 57/024* (2013.01); *B62D 65/02* (2013.01); *Y10S 901/01* (2013.01); *Y10T 29/49826* (2015.01)

(58) Field of Classification Search
CPC ........ B25J 5/005; B25J 5/007; B62D 55/075; B62D 55/065; B62D 55/0655
USPC ......... 180/9.32, 9.42, 9.1; 280/5.22; 700/245, 700/259; 901/1; 74/490.01, 490.02
See application file for complete search history.

(56) References Cited

U.S. PATENT DOCUMENTS

| 4,512,709 | A | 4/1985 | Hennekes et al. |
|---|---|---|---|
| 4,621,562 | A | 11/1986 | Carr et al. |
| 4,695,027 | A | 9/1987 | Lindholm et al. |
| 4,996,753 | A | 3/1991 | Jones |
| 5,214,749 | A | 5/1993 | Brown |
| 5,860,900 | A | 1/1999 | Dunning et al. |
| 7,860,614 | B1 * | 12/2010 | Reger ............................. 700/264 |
| 7,891,446 | B2 * | 2/2011 | Couture et al. .............. 180/9.32 |
| 7,926,598 | B2 * | 4/2011 | Rudakevych ................ 180/9.32 |
| 8,108,092 | B2 * | 1/2012 | Phillips et al. ................... 701/23 |
| 2007/0209844 | A1 * | 9/2007 | Kamimura .................... 180/9.32 |
| 2008/0167752 | A1 | 7/2008 | Jacobsen |
| 2008/0296853 | A1 * | 12/2008 | Langford et al. ............. 280/5.22 |
| 2009/0314554 | A1 | 12/2009 | Couture et al. |
| 2010/0116566 | A1 * | 5/2010 | Ohm et al. ...................... 180/8.2 |
| 2010/0158656 | A1 * | 6/2010 | Seavey ........................ 414/744.5 |
| 2011/0017030 | A1 * | 1/2011 | Chambers ......................... 83/13 |
| 2011/0040427 | A1 * | 2/2011 | Ben-Tzvi .......................... 701/2 |
| 2011/0061951 | A1 * | 3/2011 | Gal ................................. 180/8.7 |
| 2011/0168460 | A1 * | 7/2011 | Goldenberg et al. .......... 180/9.3 |

* cited by examiner

*Primary Examiner* — Anne Marie Boehler

(57) ABSTRACT

A driving flipper with a robotic arm and a method for protecting the robotic arm. A robotic platform having a main frame and at least one obstacle climbing flipper with a robotic arm. The robotic arm has a folded mode substantially parallel to the longitudinal axis of the obstacle climbing flipper. The robotic arm has an operational mode protruding away from the longitudinal axis in an angle of at least 45 degrees.

17 Claims, 6 Drawing Sheets

DRIVING FLIPPER WITH ROBOTIC ARM

RELATED APPLICATION

This application claims the benefit of priority under 35 USC §119(e) of U.S. Provisional Patent Application No. 61/625,203 filed Apr. 17, 2012, the contents of which are incorporated herein by reference in their entirety.

FIELD AND BACKGROUND OF THE INVENTION

The present invention, in some embodiments thereof, relates to a robotic platform and, more particularly, but not exclusively, to a robotic platform having one or more obstacle climbing flipper moving mechanism.

Flippers are used in robotic platforms for climbing obstacles such as stairs, rocks and slopes. Couture et al. (U.S. Patent Publication No. 2009/0314554) describe a mobile robot with two sets of left and right driving flipper associated with a chassis. In some implementations, each flipper is independently rotatable about a pivot axis with respect to the chassis allowing the chassis to tilt about the pivot axis with respect to the first and second sets of flippers.

Robotic arms are mounted on robotic platforms in a few typical configurations. Jacobsen (U.S. Patent Publication No. 2008/0167752) discloses a tracked robotic crawler with at least one articulated arm which moves relative to the frame unit in at least one dimension. Carr et al. (U.S. Pat. No. 4,621,562) discloses an unmanned remote control robot vehicle comprising a first arm having first and second ends, wherein said first end of said arm is pivotally connected to torrent assembly. The torrent assembly is rotatably connected to a chassis.

Robotic arms typically comprise a plurality of articulated links. Hinge joints can be used at alternating angles (eg perpendicular to each other) to improve flexibility of shape. In robotic arms the last element in the system, i.e. the wrist, generally has a moveable end effector to which is attached a gripper or some other tool. Several strategies are known in the art to replace end effectors. Hennekes et al. (U.S. Pat. No. 4,996,753) describe a robot end effector exchange system which permits use of a plurality of different end effectors. Dunning et al. (U.S. Pat. No. 5,860,900) describe an end effector storage station which stores end effectors in a horizontal and cantilevered position. The robot end effector exchange system also permits attachment and detachment of the end effector as a result of simple linear motion of the robot arm. Hennekes et al. (U.S. Pat. No. 4,512,709) describes a machine mechanism which utilizes an interchangeable plurality of tools.

Many robotic platforms use mechanisms for to eliminate reaction forces generated by robot manipulation, for example counterweights. Another mechanism is taught in Brow and Mass (U.S. Pat. No. 5,214,749) which discloses a robotic platform with a dynamically controlled center of mass having a dynamic controller for moving the robot arms so that for each dimension of movement of the end effector there are two degrees of freedom of the robot arm to decouple the center of mass from the end effector. Lindholm et al. (U.S. Pat. No. 4,695,027) disclose how to arrange a second robotic arm and a counterweight to be displaceable on the primary arm the center of gravity of the arm system is situated in immediate proximity to the pivotal axis of the primary arm on the stand, whereby the secondary arm and the counterbalance are at the same time linearly displaceable towards and away from each other, respectively, on respective sides of the pivot axis by means of a movement-transmitting mechanism.

SUMMARY OF THE INVENTION

According to an aspect of some embodiments of the present invention there is provided a robotic platform comprising: a main frame; at least one obstacle climbing flipper mounted on the main frame having a moving mechanism and having robotic arm mounted on the at least one obstacle climbing flipper having a proximal end and a distal end; and an end effector mounted on the distal end; wherein the robotic arm has a folded mode and an operational mode, when the robotic arm being substantially parallel to a longitudinal axis of the obstacle climbing flipper when in the folded mode and protrudes away from the longitudinal axis in an angle of at least 45 degrees from the longitudinal axis when in the operational mode.

Optionally, the robotic arm in the folded mode is encircled by the moving mechanism. Optionally, the moving mechanism is a continuous track which encircles the robotic arm in the folded mode. Optionally, the continuous track encircles exactly two driving wheels. Optionally, the obstacle climbing flipper is laterally mounted in parallel to the main frame when the robotic arm is in the folded mode. Optionally, the robotic arm is connected to the obstacle climbing flipper by a plurality of joints to allow multiple degrees of freedom for manipulations by the robotic arm. Optionally, the robotic arm is rotatable about a point of attachment to the obstacle climbing flipper. Optionally, the obstacle climbing flipper has a plurality of foramens and the robotic arm occupies at least part of the plurality of foramen when the robotic arm is in the folded mode. Optionally, the robotic arm protrudes laterally with respect to the obstacle climbing flipper. Optionally, the main frame has a top side and the top side is essentially flat thereby creating a surface for loading objects. Optionally, the robotic platform further comprises an image sensor wherein the main frame has a top side which is essentially flat and the image sensor is mounted on the top side. Optionally, the robotic platform further comprises a front robotic arm for controlling a center of gravity of the robotic platform wherein the main frame has a front side and the front robotic arm robotic arm is mounted on the front side.

Optionally, the robotic platform, wherein at right and a left obstacle climbing flippers are mounted on the robotic platform and a right robotic arm is connected to right obstacle climbing flipper and a left robotic arm is connected to left obstacle climbing flippers and a right end effector is connected to the right robotic arm and a left end effector is connected to the left robotic arm and the right robotic arm replaces the left end effector and the left robotic arm replaces the right end effector. Optionally the robotic platform, further comprises an image sensor, wherein at right and a left obstacle climbing flippers are mounted on the robotic platform and a right robotic arm is connected to right obstacle climbing flipper and a left robotic arm is connected to left obstacle climbing flippers, and the image sensor is mounted the robotic platform between the right robotic arm and the left robotic arm, covering a substantial part of the right robotic arm and the left robotic arm's operational space. Optionally, the robotic platform, further comprises an image sensor, wherein the image sensor is mounted at a joint around which the obstacle climbing flipper is tilted.

According to an aspect of some embodiments of the present invention there is provided a robotic platform comprising a front robotic arm for controlling the robotic platform's center of gravity wherein the front robotic arm moves essentially away from and towards the robotic platform. Optionally, the robotic platform further comprises at least one obstacle climbing flipper.

According to an aspect of some embodiments of the present invention there is provided method of protecting robotic arms and their end effectors while driving a robotic platform by folding the robotic arms and end effectors into obstacle climbing flippers.

According to an aspect of some embodiments of the present invention there is provided a process for manufacturing of a robotic platform, comprising: assembling a robotic arm on an obstacle climbing flipper; and connecting the obstacle climbing flipper to a robotic platform; wherein the robotic arm has a folded mode and an operational mode, when the robotic arm being substantially parallel to a longitudinal axis of the obstacle climbing flipper when in the folded mode and protrudes away from the longitudinal axis in an angle of at least 45 degrees from the longitudinal axis when in the operational mode.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
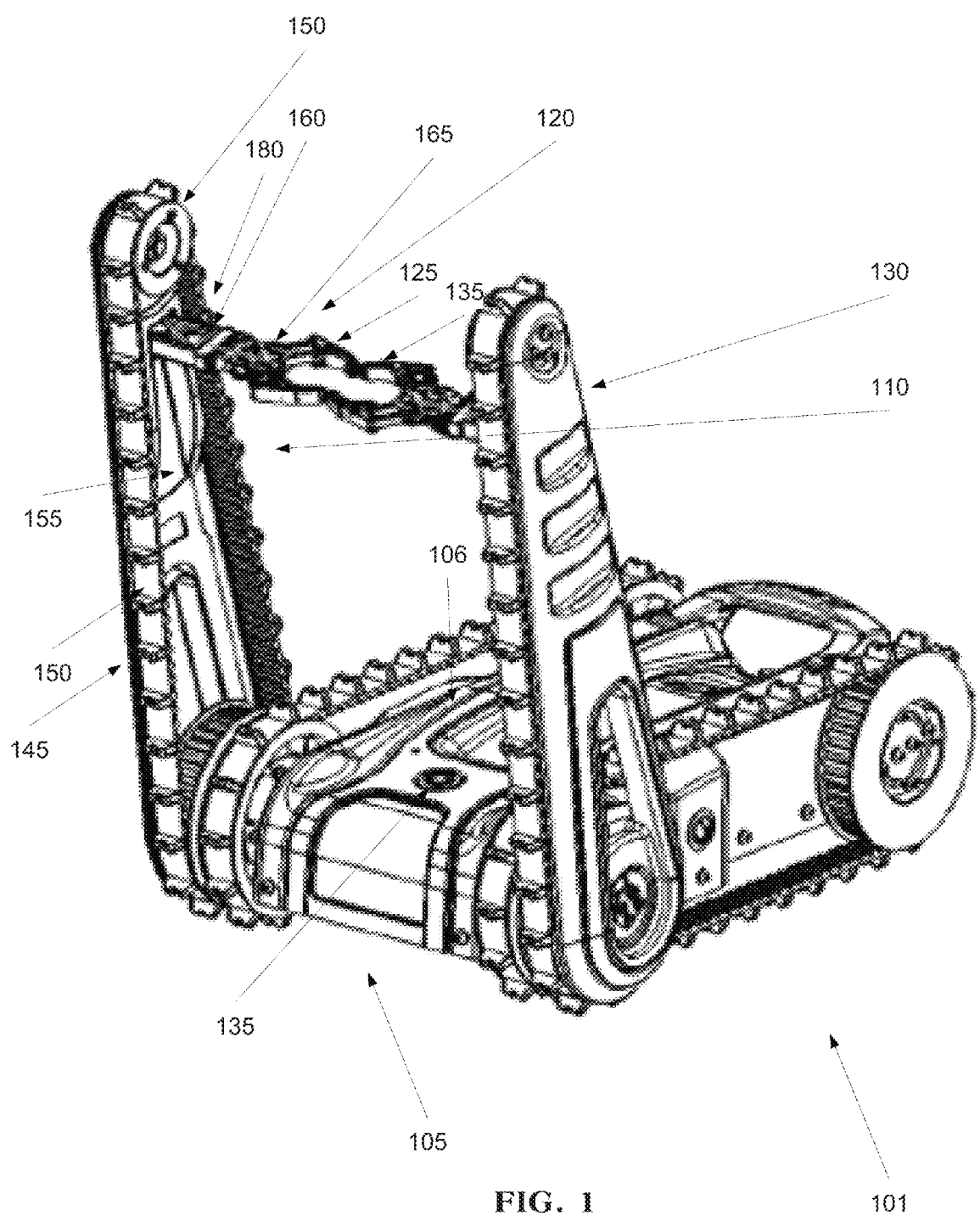
FIG. 1 is a front view of a robotic platform with robotic arms in operational mode, according to some embodiments of the present invention.

The present invention, in some embodiments thereof, relates to a robotic platform and, more particularly, but not exclusively, to a robotic platform having one or more obstacle climbing flipper. The present invention, in some embodiments thereof, relates to a robotic arm which is mounted on an obstacle climbing flipper of a robotic platform. When the robotic platform is mobilized, the robotic arm is folded into foramens of the obstacle climbing flipper. In operational mode the robotic arm protrudes out essentially perpendicular to the obstacle climbing flipper and manipulates objects with or without the assistance of an image sensor. The robotic arm is attached by moveable connectors which provide the robotic arm degrees of freedom. The flippers moving mechanism provides additional degrees of freedom to the robotic arm using existing structure and propulsion elements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
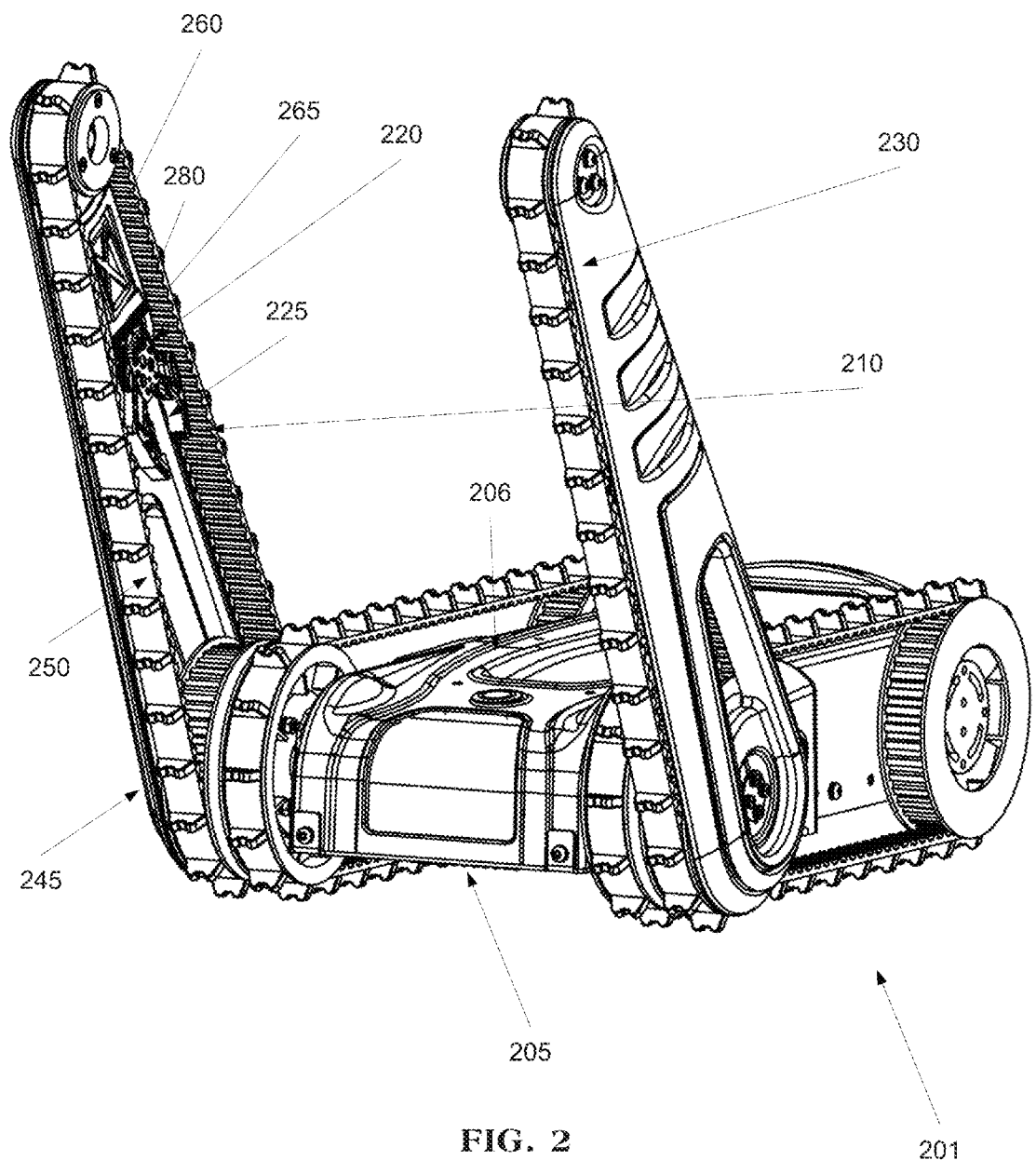
FIG. 2 is a front view of a robotic platform with robotic arms in folded mode, according to some embodiments of the present invention.

Referring now to the drawings, FIG. 1 illustrates the 3D schematic front view of a robotic platform 101 with robotic arms 120, 135 in operational mode. As used herein, the term robotic arm means a mechanical controllable arm. As used herein, the term operational mode means a state of a robotic arm in which the robotic arm is essentially perpendicular to an obstacle climbing flipper. The robotic arm length may be smaller than 25% of the length of the obstacle climbing flipper to which the robotic arm is attached. An image sensor may be mounted at the joint around which the obstacle climbing flipper is tilted, for example the joint which connects the obstacle climbing flipper to a mobilized platform. In such a configuration the field of view of the image sensor is not concealed by the obstacle climbing flipper. Such a field of view may cover essentially half a sphere of visibility. The robotic platform 101 includes a main frame 105 with a driving mechanism, for example, a continuous track or a set of wheels. Two obstacle climbing flippers 110, 130 are mounted on the main frame 105. As used herein, the term obstacle climbing flipper means an element of a robotic platform with a moving mechanism which enhanced the obstacle climbing capabilities of the robotic platform. The obstacle climbing flipper 110 has a moving mechanism 150, for example a continuous track. As used herein, the term moving mechanism means a device for moving a robotic platform and/or any of its parts. The left obstacle climbing flipper 110 has foramens 155 which harbor the left robotic arm 120 in its folded mode. As used herein, the term foramen means a hole, a gap, an opening, a crack, a break, a puncture, an aperture and/or similar material deficiencies. The left robotic arm 120 in its folded mode is parallel to the left obstacle climbing flipper 110. Optionally, the left robotic arm 120 folds away from the robotic platform 101. The left robotic arm 120 is protected by the left obstacle climbing flipper 110 in the folded mode as depicted in FIG. 2. The left robotic arm 120 is perpendicular to the longitudinal axis 145 of the left obstacle driving flipper 110. The left robotic arm 120 is capable of protruding towards the left and/or right side. The proximal end 160 of the left robotic arm 120 is connected to a part of the left robotic arm 120, for example connected to a hinge, a joint, a pivot and/or another moveable link of the left robotic arm 120 with another part of a robotic platform, and/or any connecting element which provides additional degrees of freedom. The left end effector 125 is connected to the left robotic arm 120 at the left distal end 165. The left end effector 125 is an apparatus at the end of a robotic arm, for interacting with the environment, for example a crab-like claw, a rotating shaft, a magnet, a container and/or a hook that may be used for gripping, picking, actuating, holding, storing, scooping, lifting, pinching and/or manipulating objects. As used herein, the term distal end means a part of a robotic arm which is connected to an end effector. The left end effector 165 is connected to the left robotic arm 120 by hinges, pivots or other connector allowing additional degrees of freedom. A right obstacle driving flipper 130 has a right robotic arm 135. In this example the right robotic arm's 135 structure and/or attachment is symmetric with respect to the right robotic arm 120. The right and left obstacle climbing flippers may also be mounted in different locations with respect to the robotic platform. The image sensor 140 is mounted on the main frame 105 between the left obstacle driving flipper 110 and the right obstacle driving flipper 130, thereby allowing the image sensor 140 to view essentially the entire operational space of the left robotic arm 120 and the right robotic arm 135, leaving the top side 106 of the main frame 105 essentially flat.

Reference is now made to FIG. 2, which illustrates a front view of a robotic platform 201 as depicted in FIG. 1 with robotic arms 220, 235 in folded mode. As used herein, the term folded mode means a state of a robotic arm in which the robotic arm is essentially parallel to an obstacle climbing flipper. The left robotic arm 220 is protected by the left obstacle climbing flipper 210 in the folded mode. The left end effector 225 may also be protected by the left obstacle climbing flipper 210 in the folded mode. The left robotic arm 220 in its folded mode does not add to the width and height of the robotic platform 201. The left robotic arm 220 is parallel to the longitudinal axis 245 of the left obstacle driving flipper 210. The robotic platform 201 may be remotely controlled. The robotic platform 201 is capable of climbing obstacles including, but not limited to, stairs, ditches, rocks, sewer tunnels, and uneven rough terrain.

Figure 3:
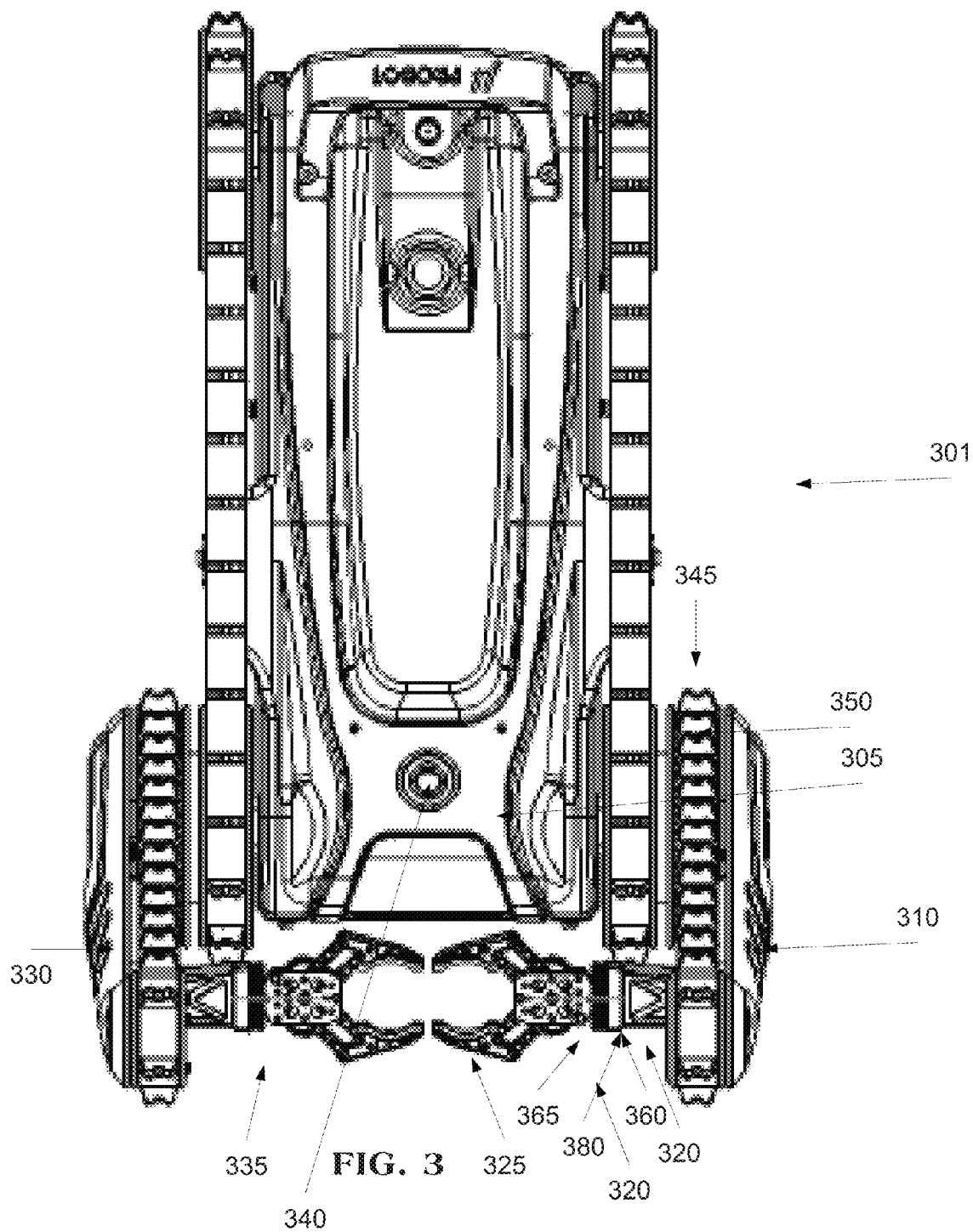
FIG. 3 is a top view of a robotic platform with robotic arms in operational mode, according to some embodiments of the present invention.

Reference is now made to FIG. 3, which illustrates a top view of a robotic platform 301 with robotic arms 320, 335 in operational mode. The main frame 305 has a driving mechanism, for example, a continuous track. A right obstacle climbing flipper 310 and a left obstacle climbing flipper 330 are mounted on the main frame 305. The right obstacle climbing flipper 310 has a moving mechanism 350, for example a continuous track. The obstacle climbing flippers may be low weight obstacle climbing flippers and/or have a low weight robotic arm thereby contributing to overall robotic platform 301 low weight, which is advantages for higher speed, lower fuel consumption and maneuverability. The robotic arm 320 is perpendicular to the longitudinal axis 345 of the right obstacle driving flipper 310. The right proximal end 360 of the right robotic arm 320 is connected to the right obstacle driving flipper 310 with joints 380. The right end effector 325 is connected to the right robotic arm 320 at the right distal end 365. The right end effector 325 is, for example, a crab-like claw. The right end effector 365 is connected to the right robotic arm 320 by hinges, pivots or other connector allowing additional degrees of freedom. The left obstacle driving flipper 330 has a left robotic arm 335. In this example the left robotic arm's 335 structure and/or attachment is symmetric with respect to the right robotic arm 320. The image sensor 340 is mounted on the main frame 305 between the right obstacle driving flipper 310 and the left obstacle driving flipper 330, thereby allowing the image sensor 340 to view essentially the entire operational space of the right robotic arm 320 and the left robotic arm 335, leaving the top side 306 of the main frame 305 essentially flat. The image sensor may be a 3D vision camera. The combination of the 3D vision camera with a single robotic arm or multiple robotic arms enables gentle and precise work, for example: bomb dismantling, door knob opening, turning switches on or off. Essentially no major protruding elements are mounted on the top side of the robotic platform 301. The top side is kept essentially flat. The top side is used to carry objects which are picked by the robotic arm and/or otherwise loaded onto the platform.

Figure 4:
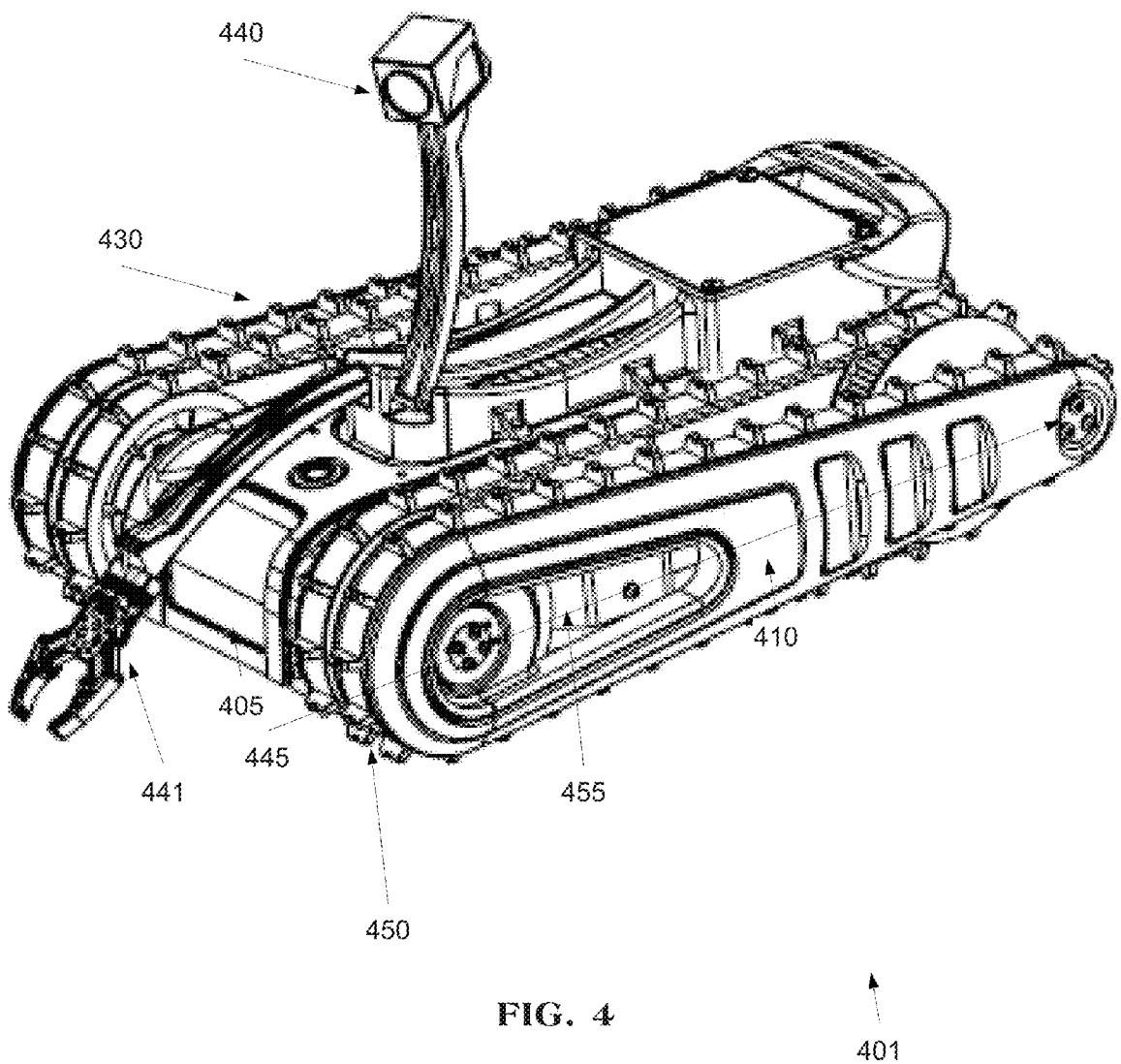
FIG. 4 is a frontal view of a robotic platform with a front robotic arm, according to some embodiments of the present invention.

Reference is now made to FIG. 4, which illustrates a frontal view of a robotic platform 401 with a front robotic arm 441. As used herein, the term front robotic arm means any robotic arm mounted on front side of a robotic platform. Elements, robotic platform 401, main frame 405, right obstacle climbing flipper 410, left obstacle climbing flipper 430 longitudinal axis 445 and moving mechanism 450 are as depicted in FIG. 3 above. A front robotic arm 441 is connected at the front side of the robotic platform 401. The front robotic arm 441 has a crab-like claw. The left obstacle driving flipper 430 has a left robotic arm. The left robotic arm is in a folded mode, parallel to the longitudinal axis of the left obstacle driving flipper 430. An image sensor 440 is mounted on a rod on top of the main frame 405. The front robotic arm 441 moves according to the shifting weight of the robotic platform 405. For example, the front robotic arm 441 moves forward away from the main frame 405 and backward toward the main frame. The forward and backward movement of the front robotic arm 441 balances the weight of the robotic platform. For example, when the robotic platform 405 climbs up stairs the front robotic arm 441 is moved forward. When the robotic platform 405 climbs down stairs the front robotic arm 441 is moved backward and/or folded the movement of the front robotic arm balances the robotic platform 405. The front robotic arm's control is fully automated. The front robotic arm 441 is remotely controlled using 3D vision for visualization of the location of the front robotic arm and its elements and/or for visualization of the front robotic arm's surroundings. The location of the front robotic arm 441 is optimally chosen for controlling the center of gravity.

Figure 5:
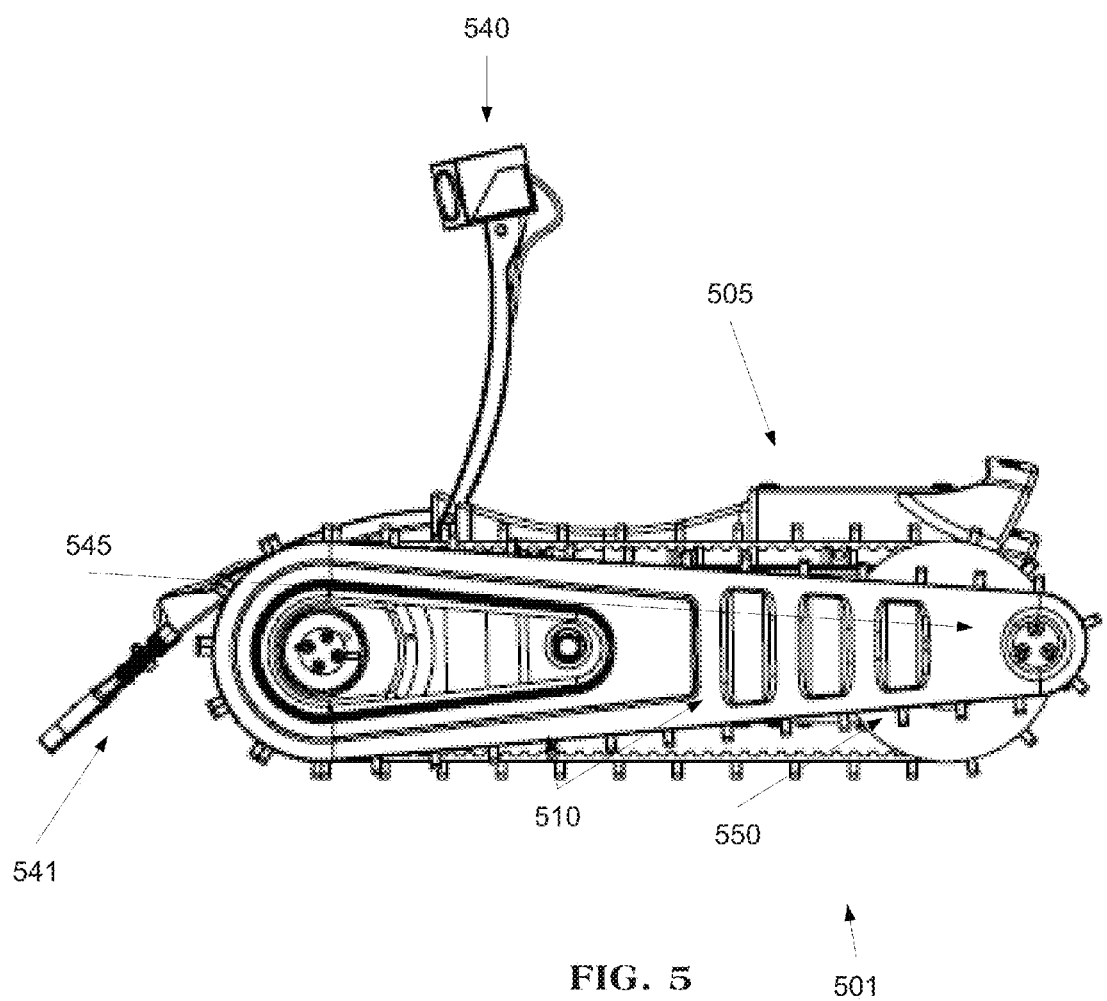
FIG. 5 is a side view of a robotic platform with a front robotic arm, according to some embodiments of the present invention.

Reference is now made to FIG. 5, which illustrates a side view of a robotic platform 501 with a front robotic arm 541. The main frame 505 has a driving mechanism, for example, a continuous track. A right obstacle climbing flipper 510 is mounted on the main frame 505. The right obstacle climbing flipper 510 has a moving mechanism 550, for example a continuous track. The robotic arm is in a folded mode, parallel to the longitudinal axis 545 of the right obstacle climbing flipper 510. A front robotic arm 541 is connected at the front side of the robotic platform 501. The front robotic arm has a crab-like claw. An image sensor 540 is mounted on a rod on top of the main frame 505.

Figure 6:
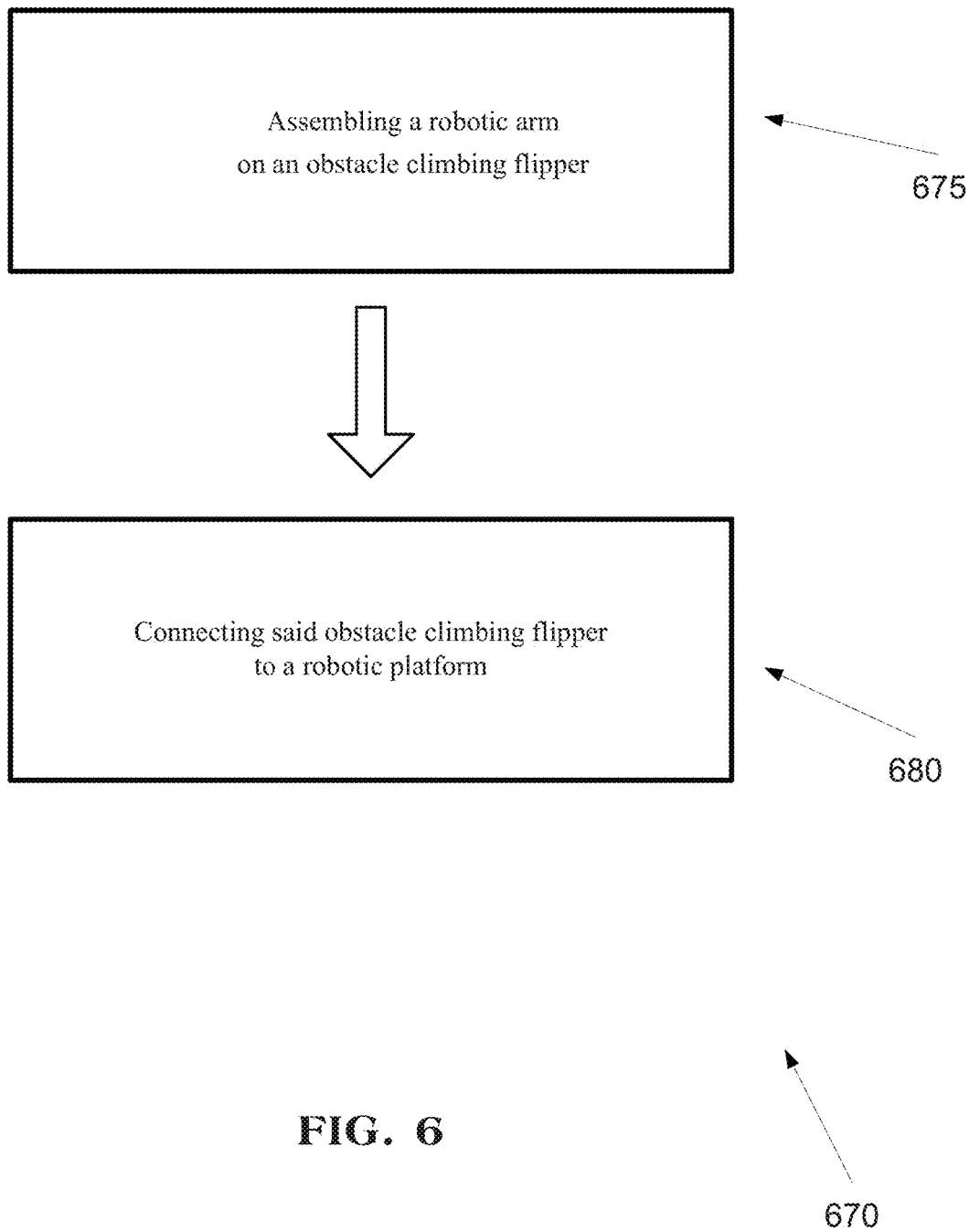
FIG. 6 is a flowchart of the process for manufacturing a robotic platform, according to some embodiment of the present invention.

Reference is now also made to FIG. 6, which is a flowchart of a method 670 for manufacturing a robotic platform, such as the robotic platforms depicted in FIGS. 1, 2, 3, 4 and/or 5, according to some embodiments of the present invention. First, as shown at 675, a robotic arm is assembled on an obstacle climbing flipper. Then, as shown at 680 the obstacle climbing flipper is connected to the robotic platform. The connection of the obstacle climbing flipper to the robotic platform can be through a hinge, a joint, a pivot and/or another moveable link which enables the robotic arm to have an operational mode and a folded mode. In the folded mode the robotic arm is substantially parallel to a longitudinal axis of the obstacle climbing flipper. In the folded mode the robotic arm protrudes away from the longitudinal axis of the obstacle climbing flipper in an angle of at least 45 degrees. More than a single obstacle climbing flipper carrying a robotic arm may be mounted on a single robotic platform. The robotic arm assembly may be performed before or after the obstacle climbing flipper was mounted on the robotic platform.

The present invention, in some embodiments thereof, relates to a robotic platform with at least two lateral robotic arms. Each robotic arm has two degrees of freedom. One of the degrees of freedom is an integral moving mechanism of the obstacle climbing flipper on which the robotic arm is mounted. This configuration takes advantage of existing structures and minimizes the moving mechanisms of the robotic platform while maintaining multiple degrees of freedom.

It is expected that during the life of a patent maturing from this application many relevant obstacle climbing flippers, main frames, robotic arm, end effector, image sensors, joints and moving mechanisms will be developed and the scopes of the terms obstacle climbing flippers, main frames, robotic arm, end effector, image sensors, joints and moving mechanisms are intended to include all such new technologies respectively a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A robotic platform comprising:
   a main frame;
   a plurality of obstacle climbing flippers each mounted on said main frame and having a continuous track;
   a plurality of robotic arms each mounted on one of said plurality of obstacle climbing flippers;
   a plurality of end effectors each mounted on a distal end of one of said plurality of robotic arms;
   wherein each one of said plurality of robotic arms has a folded mode and an operational mode, said robotic arm is parallel to a longitudinal axis of said obstacle climbing flipper when in said folded mode and laterally protrudes away from said longitudinal axis toward another of said plurality of robotic arms when in said operational mode.

2. The robotic platform of claim 1, wherein each one of said plurality of robotic arms in said folded mode is encircled by said continuous track.

3. The robotic platform of claim 1, wherein said continuous track encircles said robotic arm when said robotic arm is in said folded mode.

4. The robotic platform of claim 3, wherein said continuous track encircles exactly two driving wheels.

5. The robotic platform of claim 1, wherein each one of said plurality of robotic arms is laterally mounted in parallel to said main frame when said plurality of robotic arms are in said folded mode.

6. The robotic platform of claim 1, wherein each one of said plurality of robotic arms is connected to one of said plurality of obstacle climbing flippers by a plurality of joints to allow multiple degrees of freedom for manipulations by said robotic arm.

7. The robotic platform of claim 1, wherein each one of said plurality of robotic arms is rotatable about a point of attachment to one of said plurality of obstacle climbing flippers.

8. The robotic platform of claim 1, wherein each one of said plurality of obstacle climbing flippers has a plurality of foramens and each one of said plurality of robotic arms occupies at least part of a respective one of said plurality of foramens when said robotic arm is in said folded mode.

9. The robotic platform of claim 1, wherein said main frame has a top side and said top side is essentially flat thereby creating a surface for loading objects.

10. The robotic platform of claim 1, further comprising an image sensor wherein said main frame has a top side which is essentially flat and said image sensor is mounted on said top side.

11. The robotic platform of claim 1, further comprising a front robotic arm for controlling a center of gravity of said robotic platform wherein said main frame has a front side and said front robotic arm robotic arm is mounted on said front side.

12. The robotic platform of claim 1, wherein each one of said plurality of obstacle climbing flippers is mounted to rotate around a common axis traversing said main frame.

13. The robotic platform of claim 1,
wherein said robotic platform further comprises an image sensor mounted on said robotic platform to image an operational space of said plurality of robotic arms.

14. The robotic platform of claim 1, further comprising an image sensor, wherein said image sensor is mounted at a joint around which one of said plurality of obstacle climbing flippers is tilted.

15. The robotic platform of claim 1, further comprising a front robotic arm for controlling said robotic platform's center of gravity wherein said front robotic arm moves essentially away from and towards said robotic platform.

16. The robotic platform of claim 1, wherein each one of said plurality of obstacle climbing flippers comprises a right obstacle climbing flipper and a left obstacle climbing flipper which are mounted to rotate around a common axis traversing said main frame, wherein a right robotic arm is mounted on said right obstacle climbing flipper and a left robotic arm is mounted on said left obstacle climbing flipper; and
wherein a respective said robotic arm of each of said left and right obstacle climbing flippers extends toward another said robotic arm of said left and right obstacle climbing flippers.

17. A process for manufacturing of a robotic platform, comprising:
assembling a plurality of robotic arms on a plurality of obstacle climbing flippers, each one of said plurality of obstacle climbing flippers having a continuous track;
assembling a plurality of end effectors each on a distal end of one of said plurality of robotic arms;
connecting said plurality of obstacle climbing flippers to a robotic platform;
moving each one of said plurality of robotic arms from a folded mode to an operational mode, said robotic arm is parallel to a longitudinal axis of said obstacle climbing flipper when in said folded mode and protrudes away from said longitudinal axis toward another of said plurality of robotic arms when in said operational mode.

* * * * *